United States Patent [19]

Neubert et al.

[11] 4,210,475

[45] Jul. 1, 1980

[54] ADHESION METHOD EMPLOYING LIGNIN AMINE CORD ADHESIVES

[75] Inventors: Terry C. Neubert, Ravenna; Donald W. Anderson, Norton, both of Ohio

[73] Assignee: The General Tire & Rubber Company, Akron, Ohio

[21] Appl. No.: 2,432

[22] Filed: Jan. 10, 1979

Related U.S. Application Data

[63] Continuation of Ser. No. 826,281, Aug. 22, 1977, abandoned.

[51] Int. Cl.² .......................... B29H 5/02; B60C 5/00; C09J 5/00
[52] U.S. Cl. ................................ 156/110 A; 152/359; 156/315; 156/331; 156/328; 156/335; 260/17.5; 260/29.3; 260/29.2 N; 427/389.8; 427/407.3; 428/392; 525/182
[58] Field of Search .................. 156/110 A, 331, 315, 156/335, 328; 427/390 A, 407 B; 428/25, 436, 392; 106/123 R; 260/17.5, 29.3, 29.2 N, 846, 124 R, 124 A; 152/359

[56] References Cited

U.S. PATENT DOCUMENTS

| | | | |
|---|---|---|---|
| 2,357,090 | 8/1944 | D'Alelio | 260/17.5 |
| 2,417,975 | 3/1947 | Ebers | 156/110 A |
| 2,709,696 | 5/1955 | Wiest et al. | 260/124 A |
| 2,956,033 | 10/1960 | Apel | 260/17.5 |
| 3,262,482 | 7/1966 | Clifton et al. | 156/335 |
| 3,597,379 | 8/1971 | Van Valkenburg | 156/335 |
| 3,929,695 | 12/1975 | Murata et al. | 260/17.5 |
| 4,127,544 | 11/1978 | Allan | 260/17.5 |

FOREIGN PATENT DOCUMENTS

986711  3/1965  United Kingdom .................... 260/17.5

*Primary Examiner*—John T. Goolkasian
*Assistant Examiner*—J. J. Gallagher

[57] ABSTRACT

Rubber compounds are readily bonded to tire cords using a dip process in which the dip contains an alkaline aqueous dispersion of a mixture of a major amount by weight of a rubbery vinyl pyridine/styrene/butadiene copolymer and a minor amount of a lignin amine-resorcinol-formaldehyde reaction product.

11 Claims, No Drawings

ADHESION METHOD EMPLOYING LIGNIN AMINE CORD ADHESIVES

This is a continuation of application Ser. No. 826,281 filed Aug. 22, 1977, now abandoned.

BACKGROUND OF THE INVENTION

The present invention relates to compositions and methods of bonding cord tire reinforcement to the conjugated diene rubber of tire carcasses and the improved structure obtained thereby.

Tire cord is received from the manufacturer in the form of a fabric. The general practice is to prepare the cord by applying a dip coating of a latex. The dip coating of the cord generally used contains a vinyl pyridine/styrene/butadiene copolymer and a resorcinol-formaldehyde (RF) resin. While these RF resins are quite effective in performing their desired function, the resorcinol component is expensive and often unobtainable in the quantities needed.

Materials in addition to RF resins have been used in the prior art to improve adhesion in special circumstances. For instance, proprietary formulations of unknown composition are marketed for this purpose. In addition, lignin sulfonates are known as replacements for resorcinol in cord dips, see U.S. Pat. Nos. 4,016,119 and 4,026,744 of Elmer, 1977.

SUMMARY OF THE INVENTION

According to the present invention, it has been discovered that reinforcing cords, particularly glass, but also other cords such as rayon, nylon, polyester, and aramid (also known as Kevlar)*, can be directly bonded or adhered to cured rubber by first dipping the cords in a dip containing an aqueous alkaline dispersion of a mixture of a rubbery vinyl pyridine copolymer, a resorcinol-formaldehyde-lignin amine reaction product, drying the same, and combining said dipped and dried element with a vulcanizable conjugated diene rubber compound such as a butadiene-styrene rubber compound and vulcanizing the same. Reinforcing cords treated in this fashion exhibit high rubber to cord adhesion values.

*Available from duPont

The lignin amines are used to emulsify asphalt and are available or can be made available when resorcinol is in short supply. The advantages over the lignin sulfonate are that the lignin amines are available in a purer form and exhibit antioxidant properteries when used in a cord dip.

DISCUSSION OF DETAILS AND PREFERRED EMBODIMENTS

In the present application the term "cords" is intended to include reinforcing elements used in rubber products including fibers, continuous filaments, staple, tow, yarns, fabric and the like, particularly cords for use in building the carcasses of tires such as truck tires.

The reinforcing element or cord comprises a plurality of substantially continuous fibers or mono-filaments.

In the case of glass, the reinforcing element or fibers contain little or no twist. In other words, twist is not intentionally applied to the element or fibers; the only twist, if any, in the element or fibers is that occasioned on passing through the glass fiber processing apparatus and on packaging or winding up the cord to form a bobbin or spool. However, in a continuous process, the elements can proceed directly from the glass processing apparatus, can be dipped in the aqueous adhesive cord dip, dried, and given a twist of about 1.5 turns per inch thereafter. The elements then are woven into tire fabric having about one quite small pick thread or element, nylon or polyester, which may be a mono-filament, per inch and calendered with a rubber ply or skim stock. The glass fiber reinforced ply stock is then ready to be used in the manufacture of a tire or for other purposes.

Glass compositions, polyesters, polyamides and a number of other materials, useful in making the fibers for the reinforcing element or glass tire cord are well known to the art. One of the preferred glasses to use is a glass known as E glass and described in "Mechanics of Pneumatic Tires," Clark, National Bureau of Standards Monograph 122, U.S. Dept. of Commerce, issued November 1971, pages 241-243, 290 and 291. The number of filaments or fibers employed in the fiber reinforcing element or cord can vary considerably depending on the ultimate use or service requirements. Likewise, the number of strands of fibers used to make a fiber reinforcing element or cord can vary widely. In general, the number of filaments in the fiber reinforcing element or cord for a passenger car tire can vary from about 500 to 3,000 and the number of strands in the reinforcing element can vary from 1 to 10, preferably the number of strands is from 1 to 7 and the total number of filaments about 2,000. A representative commercial glass tire cord known as G-75 (or G-72, 5/0) has 5 strands each with 408 glass filaments. Another representative cord known as G-15 has a single strand containing 2,040 glass filaments. In this connection reference is made to Wolf, "Rubber Journal," February, 1971, pages 26 and 27 and U.S. Pat. No. 3,433,689.

Shortly after the glass fibers are formed they are usually sized (by spraying or dipping and so forth and air drying) with a very small amount or fractional amount by weight of a material which acts as a protective coating during processing and handling of the glass fibers in forming the strands or reinforcing elements and during packaging. During the subsequent dipping in the aqueous adhesive tire cord dip, it is believed that the size is not removed. Materials for use as sizes for glass fibers are well known to the art. It is preferred to use a silane as a size, especially a silane which has groups which can bond or coordinate chemically or physically with at least parts of the surface of the glass of the glass fiber and with at least one or more of the components of the glass fiber aqueous adhesive cord dip. A very useful size to employ on the glass fibers is gamma-aminopropyl triethoxy silane, or similar aminoalkyl alkoxy silanes, which, when applied to the glass fibers, hydrolyzes and polymerizes to form a poly (aminosiloxane) in which a portion of the polymer is attached to the glass and another portion containes amine groups (having active hydrogen atoms) for reaction with components of the cord dip such as the RF resin or the vinyl pyridine copolymer compound. Various glass fiber sizing compounds and compositions are shown in U.S. Pat. Nos. 3,252,278; 3,287,204 and 3,538,974.

The type of rubber latex used in the tire cord dip bath of this invention is a latex of a copolymer of a vinyl pyridine and a conjugated diolefin having 4 to 6 carbon atoms. The rubber latex is of the type described in U.S. Pat. No. 2,561,215 and comprises an aqueous dispersion of a copolymer of 50 to 95% by weight of a conjugated diolefin having 4 to 6 carbon atoms, 5 to 40% of a vinyl pyridine and 0 to 40% of a styrene. Examples of suitable vinyl pyridines are 2-vinyl pyridine, 4-vinyl pyridine, 2-methyl-5-vinyl pyridine, and 5-ethyl-2-pyridine.

In practicing this invention, it is usually preferred to use a latex of a copolymer of from about 60 to 80% by weight of 1,3-butadiene, 10 to 30% by weight of styrene and 10 to 30% by weight of 2-vinyl pyridine, the percentage based on the weight of the three recited components. The Mooney viscosity range of the dry solids is 40 to 120, preferably 40 to 60 ML-4. Other components may be present but are not used in the calculation. Excellent results are obtained using a latex of a copolymer of about 70% of 1,3-butadiene, 15% of styrene and 15% of a 2-vinyl pyridine, by weight, having a total solids content of around 30 to 50%. The copolymer has a 4 minute Mooney viscosity ML-4 of 50 at 212° F. Further disclosures of rubbery vinyl pyridine copolymer latices may be found in U.S. Pat. Nos. 2,615,826 and 3,437,122. The copolymer can be replaced in a minor part with other elastomeric materials such as styrene-butadiene, carboxylated styrene-butadiene and other latex forming materials well known in the cord dip art.

The lignin amines usable in the dip of the present invention are selected from materials that are known in the art. They are made for example, by the reaction of ammonia, a primary or secondary amine with formaldehyde and lignin. The reaction of the amine results in the introduction of amine groups into the lignin molecule. The process is described in U.S. Pat. No. 2,709,696, Wiest, 1955. The preferred amine as a starting material is the secondary amine, most preferably dimethyl amine.

A second procedure for making lignin amines is set forth in U.S. Pat. No. 3,718,639 Falkehey, 1973. This involves reacting a lignin with the reaction product of an epichlorohydrin and a tertiary amine.

A third class of lignin amines useful in the practice of the present invention are the quaternary ammonium salts of lignin as set forth in U.S. Pat. No. 3,407,188 Cavagna, 1968.

The lignin amines used in the practice of the present invention are the water soluble ones. The preferred pH range is from 7 to 12. The nitrogen content of the lignin amine can vary from 0.1 to 6% and preferably to 3%.

Primary, secondary and tertiary amines suitable as starting material in this invention are presented by the general formula:

wherein at least two of $R_1$, $R_2$ and $R_3$ are methyl and/or hydrogen groups and the other $R_3$ contains up to 18 carbon atoms. Those tertiary amines possessing at least two methyl and/or hydrogen groups attached directly to the nitrogen are used because of their superior reactivity with formaldehyde or epichlorohydrin to form the desired intermediate. This reactivity with epichlorohydrin is retained even when the third group of tertiary amine contains as many as 18 carbon atoms, such as is found in dimethyl-stearyl amine. This high reactivity is believed to result from the low order of stearic hindrance imparted by the two methyl groups, allowing for intimate contact of epihalohydrin with the free electron pair of the tertiary amino nitrogen. By way of example, the following amines are mentioned as particularly suitable for carrying out this invention: methyl, dimethyl, trimethyl, dimethyl-benzyl, dimenthyl-dodecyl, dimethyloctyl and dimethylstearyl amines. The preferred secondary amines is the dimethyl amine.

The lignin amine reaction product of the present invention is prepared by dissolving of weight amounts of resorcinol in water by agitation; addition of measured amount of NaOH solution; slow addition of lignin amine to the agitated solution to achieve uniform wetting of the amine; agitation until the amine dissolves and addition with stirring of measured amount of formaldehyde solution with agitation for 5 minutes. The lignin amine can be added to a resorcinol-formaldehyde reaction product.

The reaction product (including unreacted components, if present) contains from 22 to 42% preferably from 27 to 37% lignin amine; from 27 to 47% preferably 32 to 42% resorcinol and from 21 to 41% preferably 26 to 36% formaldehyde. All percentages are based on dry solids of the above recited components.

The final dip is prepared by slow addition of the reaction product to the copolymer latex. After addition the mixture is aged preferably at least 16 hours before use as a cord dip. The pH of the final dip ranges from about 8 to 11 preferably about 9 to 10.

The heat reactable resorcinol-formaldehyde-lignin amine reaction product is preferably made by reacting formaldehyde (or formaldehyde donor) with resorcinol or similar phenolic compound and lignin amine in aqueous media using sodium hydroxide and the like as a catalyst to form water soluble resins containing hydroxyl and methylol groups.

The ratio of the vinyl pyridine copolymer (on a dry basis) to the reaction product of formaldehyde, resorcinol and lignin amine is from about 100:5 to 100:30 parts by weight, preferably from about 100:8 to 100:20 parts by weight.

Water is used in the dip in an amount sufficient to provide for the desired dispersion of the vinly pyridine latex particles and the solution or dispersion of the lignin amine reaction product and for the proper solids content to get the necessary pick-up of solids on and penetration between the fibers of the tire cord.

The dip thus consists essentially of an aqueous dispersion of the rubbery vinyl pyridine copolymer latex, the lignin amine reaction product; the reaction product being present in a total amount (as dry soldis, dispersed or dissolved in the water per hundred parts of latex solids) of from about 1 to 30 parts by weight, preferably 8 to 20 parts. The range of reacted and unreacted lignin amine in the dip is from about 0.3 to 10 parts, preferably 3 to 7 parts, from 0.3 to 10 parts, preferably 3 to 7 parts, of reacted and unreacted formaldehyde are present; from 0.3 to 10 parts preferably 3 to 7 parts, of reacted and unreacted resorcinol are present, and the copolymer is present at a level of 100 parts on a dry weight basis (assuming complete reaction). Sufficient alkaline material is usually present from the lignin amine reaction product solution to render the dip alkaline or additional alkaline material such a NaOH can be added to achieve this purpose. The function of the alkaline material is to prevent premature coagulation of the rubbery vinyl pyridine copolymer and also to catalyze the resorcinol-formaldehyde-lignin amine reaction The concentration of lignin amine reaction product in the aqueous dispersion is about 0.5% to about 10% and preferably about 2 to about 7%. The concentration of vinyl pyridine copolymer on a wet basis is from about 7 to 40% and preferably about 20 to 35%. The concentration of solids in the aqueous dispersion (or dip) on a wet basis is 15% to 45%, preferably 20% to 40%. A too high solids content results in coagulation of the latex and a two low solids content results in a low D.P.U. and poor performance of the cord.

In order to apply the adhesive dip to the cords in a reliable manner, the cords are fed through an adhesive dip bath containing the rubbery vinyl pyridine copolymer and the lignin amine reaction product, into a drying oven where they are dried. Also, as the cords leave the oven they enter a cooling zone where they are air cooled. In each case the adhesive-coated cords leaving the dip are dried in the oven at from about 150° to 360° C. for from about 30 to 150 seconds. The time the cord remains in the dip is about a second or so or at least for a period of time sufficient to allow wetting of the cord by the adhesive mixture.

The adhesive containing reinforcing elements of this invention is preferably adhered to a vulcanized blend of natural rubber, polybutadiene rubber, and rubbery butadiene-styrene copolymer by curing the same in combination together. The adhesive containing reinforcing element can also be adhered to other vulcanized conjugated diene rubber, by curing or vulcanizing the same in combination with the rubber. Examples of other conjugated diene rubbers include: nitrile rubbers, chloroprene rubbers, polyisoprenes, vinyl pyridine rubbers, acrylic rubbers, isoprene-acrylonitrile rubbers and the like and mixtures of the same. These rubbers prior to curing can be mixed with the usual compounding ingredients including sulfur, stearic acid, zinc oxide, magnesium oxide, accelerators, antioxidants, antizonants and other curatives and the like well known to those skilled in the art for the particular rubbers being employed. Rubbers when proportions are referred to, as referred to here and in the claims, refers to the elastomer component and excludes the above compounding ingredients, e.g., a reference to a major component of the rubber being a conjugated diene polymer would refer to a major component of the elastomeric content of the composition. The rubbers referred to above are old and well known in the art and will not be described in detail here.

The major diene component of the rubber used in the practice of the present invention is a conjugated diene as opposed to a non-conjugated diene. Preferably, the entire elastomeric component is conjugated diene polymer, free of ethylene/propylene/non-conjugated diene.

Fibers, yarns, filaments, cords or fabric and the like coated with the adhesive of the present invention can have from about 3 to 50% by weight (dry) total solids from the adhesive dip on the cord based on the weight of the undipped cord (D.P.U.) and can be used in the manufacture of radial, bias, or belted-bias passenger tires, truck tires, motorcycle and bicycle tires, off-the-road tires, airplane tires, transmission belts, V-belts, conveyor belts, hose gaskets, rubbers, tarpaulins and the like. The D.P.U. varies as to substrate as is known in the art. Glass cord, for example, requires a D.P.U. of 15 to 30% and an organic cord requires 2 to 10% preferably 3 to 8%.

The following examples will serve to illustrate the invention with more particularity to those skilled in the art. In these examples the parts and percentages are parts and percentages by weight unless otherwise indicated.

The H-adhesion test referred to above measures the static adhesion of the dried adhesive coated fibers to cured rubber.

In each case the rubber test specimens are made from a standard type rubber compositions using the following recipe:

| Stock | Parts by Weight |
| --- | --- |
| Natural Rubber (No. 3 smoked sheet) | 36.50 |
| Butadiene-styrene rubber copolymer average 23.5% bound styrene, emulsion polymerized | 43.50 |
| Polybutadiene (solution polymerized BD, about 93% cis-1,4, Raw Mooney ML-4 @ 212° F. about 40–50) | 20.0 |
| Carbon black, fast extrusion furnace | 35.0 |
| Carbon black, high abrasion furnace (high structure) | 35.0 |
| Alkyl aromatic polyindene resin, reinforcing and processing aid, Picco 100, Pennsylvania Industrial Chemical Corp. | 4.5 |
| Naphthenic oil, Circosol type 2XH, Sun Oil Co. | 32.80 |
| Zinc oxide | 3.8 |
| Stearic acid | 1.5 |
| Mixture of mono, di and tristyrenated phenols, AgeRite Spar, R.T. Vanderbilt Co., Inc., antioxidant | 1.2 |
| Benzothiazyl disulfide, Altax, R.T. Vanderbilt Co., Inc., accelerator | 1.2 |
| Tetramethyl thiuram monosulfide, active ingredient, Thionex, accelerator, E.I. duPont de Nemours & Co., Inc. | 0.1 |
| Crystex, about 80% insoluble sulfur and 20% petroleum oil, Stauffer Chemical Co. | 3.0 |

Dips were prepared that contained a molar ratio of resorcinol to formaldehyde of 1:1.6 and varying amounts of lignin amine per 100 g. latex solids. The dips were prepared by dissolving weighted amounts of resorcinol in water by agitation; addition of measured amount of NaOH solution if the solution is not sufficiently basic due to lignin amine, slow addition of lignin amine resin powder to the agitated solution to achieve uniform wetting of the dry powder; agitation until powder dissolved; addition with stirring of measured amount of formaldehyde solution; agitation for 5 minutes and slow addition of this resin to a stirred latex optionally containing a copolymer of 48% styrene and 52% butadiene (SBR) and a copolymer of 15% styrene 70% butadiene and 15% of 2-vinyl pyridine (VP). The dips are aged at least 16 hours after formulation before being used to coat cords. The SBR and VP are 41% solids in water solution.

In each of the following examples each cord tested was passed through a cord dip, dried and tested. The H-adhesion test was run using the following procedure:

In every case the cords to be treated are placed in parallel positions in a multiple-strand mold of the type described in the single-cord H-pull adhesion test designated ASTM D 2138-67, the mold is filled with unvulcanized rubber of the above-described compositions, the cords being maintained under a tension of 50 grams each, and the rubber is cured 20 minutes to the elastic state. Each rubber test specimen is 6 mm thick and has a 9 mm cord embedment.

After the rubber has been cured, the hot reticulate cured rubber piece is removed from the mold, cooled, and H-test specimens are cut from said piece, each specimen consisting of a single cord encased in rubber and having each end embedded in the center of a rubber tab or embedment having a length of around one inch or so. The specimens are then aged at least 16 hours at room temperature. The force required to separate the cord from the rubber is then determined using an INSTRON tester provided with specimen grips. The maximum force in pounds required to separate the cord from the rubber is the H-adhesion value. The hot pad test referred to in the H-adhesion testing refers to heating the embedded cord sample for four hours (unless otherwise specified), cooling the sample to 25° C., then running the H-adhesion test.

D.P.U. refers to dip pickup in precent by dry weight and represents the weight of the coating divided by the bare glass or other cord weight.

The wet dipped cords of the following examples were all predried at 98° C. prior to the high temperature drying step recited in the examples. In the following examples all of the dips had a 20% solids level. The solvent was water. All parts and percentages are on a dry solids basis unless otherwise specified.

EXAMPLE I

|  | A | B | C | D | E |
|---|---|---|---|---|---|
| Resorcinol | — | 3 | 5 | 7.5 |  |
| Lignin amine | 15 | 12 | 10 | 7.5 | — |
| Formaldehyde | 5.6 | 5.6 | 5.6 | 5.6 | 6 |
| VP | 100 | 100 | 100 | 100 | 100 |
| Sodium hydroxide | — | — | — | — | .3 |
| Ammonium hydroxide | — | — | — | — | 4.3 |

The lignin amine used in all of the specific examples set forth below was a lignin-formaldehyde-di-methyl amine reaction product believed to be produced by the procedure set forth in the first example of U.S. Pat. No. 2,709,696. The nylon cord used had 1680 denier per yarn and 2 yarns per cord. After dipping, the cord was dried at 225° C. for 80 seconds. The cord was then embedded in the rubber stock described earlier and the H-adhesion values obtained are as follows:

|  | A | B | C | D | E |
|---|---|---|---|---|---|
| "H" Adhesion, Newtons |  |  |  |  |  |
| 25° C. | 245 | 245 | 262 | 271 | 271 |
| 120° C. | 133 | 142 | 187 | 195 | 200 |
| Humid Age** | 209 | 245 | 249 | 249 | 249 |

**4 hours at 120° C.

EXAMPLE II

The polyester tire cord was dipped in the following composition. The cord was dried for 80 seconds at 225° C. The cord was then embedded in the rubber stock and the following H-adhesion values were obtained:

|  | A | B | C | D | E |
|---|---|---|---|---|---|
| Resorcinol | — | 3 | 5 | 7.5 | 16 |
| Lignin amine | 15 | 12 | 10 | 7.5 | — |
| Formaldehyde | 5.6 | 5.6 | 5.6 | 5.6 | 5.6 |
| VP | 100 | 100 | 100 | 100 | 100 |
| Sodium hydroxide | — | — | — | — | 1.3 |

The polyester fiber used had been pretreated with an epoxy compound. The pretreated cords are examples from Celanese as T-811.

|  | A | B | C | D | E |
|---|---|---|---|---|---|
| 25° C. | 142 | 187 | 254 | 258 | 258 |
| 122° C. | 76 | 107 | 156 | 160 | 173 |
| Hot Pad* | 120 | 142 | 165 | 173 | 173 |
| Humid Age** | 129 | 173 | 218 | 240 | 245 |

*24 hours at 150° C.
** 4 hours at 120° C.

EXAMPLE III

A dacron tire cord having 1300 denier yarns and 3 yarns per cord was dipped in the following formulation:

|  | A | B | C | D | E |
|---|---|---|---|---|---|
| Resorcinol | — | 3 | 5 | 7.5 | 16 |
| Lignin amine | 15 | 12 | 10 | 7.5 | — |
| Formaldehyde | 5.6 | 5.6 | 5.6 | 5.6 | 5.6 |
| VP | 100 | 100 | 100 | 100 | 100 |
| Sodium hydroxide | — | — | — | — | 1.3 |
| H-7 | 25 | 25 | 25 | 25 | 25 |

The H-7 is commercially available from ICI. The material is described in U.S. Pat. No. 3,660,202 of Edington, 1972. After the cord is dipped, it is dried at 225° C. for 80 seconds and embedded in the rubber stock. The H-adhesion values are as follows:

|  | A | B | C | D | E |
|---|---|---|---|---|---|
| 25° C. | 142 | 165 | 173 | 187 | 245 |
| 122° C. | 93 | 107 | 111.2 | 129 | 138 |
| Hot Pad | 125 | 129 | 138 | 142 | 169 |
| Humid Age** | 129 | 147 | 160 | 169 | 222 |

*24 hours at 150° C.

EXAMPLE IV

The rayon cord made 1650 denier yarn, 3 yarns per cord was dipped in the following cord dip:

|  | A | B | C | D | E |
|---|---|---|---|---|---|
| Resorcinol | — | 3 | 5 | 7.5 | 11 |
| Lignin amine | 15 | 12 | 10 | 7.5 | — |
| Formaldehyde | 5.6 | 5.6 | 5.6 | 5.6 | 16 |
| VP | 20 | 20 | 20 | 20 | 20 |
| SBR | 80 | 80 | 80 | 80 | 80 |
| Sodium hydroxide | — | — | — | — | 0.3 |

The dipped cord was dried at 233° C. for 60 seconds and embedded in the rubber stock to obtain H-adhesion values. The H-adhesion values are as follows:

|  | A | B | C | D | E |
|---|---|---|---|---|---|
| 25° C. | 200 | 231 | 235 | 249 | 236 |
| 122° C. | 116 | 165 | 173 | 187 | 182 |
| Humid Age** | 178 | 212 | 218 | 227 | 227 |

**4 hours at 120° C.

EXAMPLE V

A Kevlar tire cord having 1500 denier yarn, 3 yarns per cord was dipped in the following formulation:

|              | 1   | 2   | 3   | 4   | 5   | 6   | 7    |
|--------------|-----|-----|-----|-----|-----|-----|------|
| VP           | 100 | 100 | 100 | 100 | 75  | 75  | 100  |
| SBR          | —   | —   | —   | —   | 25  | 25  | —    |
| Lignin amine | 15  | 12  | 10  | —   | —   | 12  | —    |
| Resorcinol   | —   | 3   | 5   | —   | —   | 3   | —    |
| Formaldehyde | 6   | 6   | 6   | —   | —   | 6   | —    |
| R2170        | —   | —   | —   | 4.8 | 4.8 | —   | —    |
| 509AM6       | —   | —   | —   | 16  | 16  | —   | —    |
| D417         | —   | —   | —   | —   | —   | —   | 12.3 |

R2170 is precondensed resorcinol formaldehyde resin available from Koppers. The solvent is water. The 509AM6 formulation is a reaction product of 3 moles of formaldehyde with one mole of phenol using 0.075 moles of sodium hydroxide catalyst. The reaction product is allowed to stand for 10 days at room temperature before use. The 509AM6 is prepared as a 45% solution in water.

D417 is a mixture of a phenolic blocked isocyanate (Hylene M.P. DuPont) and an epoxy compound (Epon-812 Shell).

The cords were dried for 90 seconds at 240° C., embedded in the stock and the following H-adhesions were obtained:

|                      | 1   | 2   | 3   | 4   | 5   | 6   | 7   |
|----------------------|-----|-----|-----|-----|-----|-----|-----|
| Cold                 | 231 | 240 | 231 | 249 | 258 | 236 | 245 |
| 15 hr @ 120° C. Hot  | 125 | 142 | 147 | 151 | 151 | 111 | 138 |
| 24 hr @ 150° C.      | 178 | 156 | 165 | 187 | 182 | 165 | 169 |
| 04 hr @ 120° C. Humid| 218 | 222 | 222 | 249 | 213 | 205 | 222 |

NON-SPECIFIC EXAMPLES

A number of amine substituted lignins including quaternary ammonium salts were evaluated in cord dip compositions similar to those set forth in the specific examples. The amines were, (1) produced by reacting a primary amine with formaldehyde and a lignin, (2) produced by reacting trimethyl amine with epichlorohydrin then reacting the reaction product with a lignin, (3) quaternary amine substituted lignins, (4) other amine substituted lignins supplied by Westvaco Corporation, NY, NY. All of the amine substituted lignins performed satisfactorily in cord dips.

What is claimed is:

1. In a method for adhering a tire cord to a vulcanized conjugated diene rubber compound by treating said tire cord with a composition comprising an aqueous alkaline dispersion of from about 10 to 30% by weight (as dry solids) of a mixture of 100 parts of a rubbery vinyl pyridine copolymer containing about 50 to 95% of a conjugated diolefin, about 5 to 40% of vinyl pyridine and about 0 to 40% of a styrene; about 1.0 to 30 parts water soluble resorcinol and formaldehyde reaction product having a pH of 8-11 and heat treating said tire cord to remove the water and to heat set the solids from said composition and to deposit on said tire cord from said composition a total of from about 2 to 30% by weight (solids), said heat treatment being conducted at temperatures of from about 150° C. to 260° C. for from about 30 to 150 seconds, cooling said treated tire cord, combining said cooled treated tire cord with an unvulcanized vulcanizable rubber consisting essentially of conjugated diene as the major elastomer component, and vulcanizing the same, the improvement which comprises using as the resorcinol formaldehyde reaction product a reaction product of resorcinol, formaldehyde and a lignin amine wherein the lignin amine is selected from the class consisting of a reaction product of lignin, formaldehyde and a primary or secondary amine; a reaction product of lignin with a reaction product of an epichlorohydrin and a tertiary amine; and a quaternary ammonium salt of lignin.

2. A method according to claim 1 where said lignin amine is present at a level of from 2 to 10 parts.

3. A method according to claim 1 where said reinforcing element is a cord of glass.

4. In a tire having a tire cord embedded in a vulcanized rubber, said tire cord containing a total of from about 2 to 30% by weight (dry) based on the weight of said uncoated tire cord of an adhesive composition comprised of a deposit of heat set mixture containing 100 parts of a rubbery vinyl pyridine copolymer and 1 to 30 parts of a resin produced in a basic media said adhesive composition forming a bond between said tire cord and said rubber, wherein the improvement comprises said resin being a lignin amine and resorcinol and formaldehyde reaction product, wherein the lignin amine is selected from the class consisting of a reaction product of lignin, formaldehyde and a primary or secondary amine; a reaction product of lignin with a reaction product of an epichlorohydrin and a tertiary amine; and a quaternary ammonium salt of lignin.

5. A tires according to claim 4 where said lignin amine reaction product contains about 2 to 10 parts by weight of lignin amine, 2 to 10 parts by weight of resorcinol and 2 to 10 parts by weight of formaldehyde.

6. A tires according to claim 4 where said rubber vinyl pyridine copolymer is a copolymer containing from about 60 to 80% by weight of 1,3-butadiene, from 10 to 30% by weight of styrene, and from 5 to 30% by weight of 2-vinyl pyridine where the parts by weight ratio of said rubbery vinyl pyridine copolymer to said lignin amine reaction product is from about 100:5 to 100:30.

7. A tires according to claim 4 where said element is a cord of glass.

8. A tires according to claim 5 where said element is a cord of glass.

9. In a tire cord dip composition of an aqueous alkaline dispersion of a minor amount of weight of a mixture of 100 parts of a rubbery vinyl pyridine copolymer, and from 6 to 30 parts of resin wherein the improvement comprises the resin being a reaction product of lignin amine, resorcinol and formaldehyde produced in a basic media, the lignin amine being selected from the class consisting of a reaction product of lignin, formaldehyde and a primary or secondary amine; a reaction product of lignin with a reaction product of an epichlorohydrin and a tertiary amine; and a quaternary ammonium salt of lignin.

10. A composition according to claim 9 in which said two-component mixture is present in said dispersion in an amount of from about 15 to 45% by weight (as dry solids).

11. A composition according to claim 9 in which said reaction product contains about 2 to 10 parts by weight of a lignin amine, 2 to 10 parts by weight of resorcinol and 2 to 10 parts by weight of formaldehyde.

* * * * *

UNITED STATES PATENT AND TRADEMARK OFFICE
CERTIFICATE OF CORRECTION

PATENT NO. : 4,210,475
DATED : July 1, 1980
INVENTOR(S) : Terry C. Neubert et al.

It is certified that error appears in the above-identified patent and that said Letters Patent are hereby corrected as shown below:

Column 10, line 18 which reads: "of heat" should read ---of a heat---.

Column 10, line 30 which reads: "tires" should read ---tire---.

Column 10, line 34 which reads: "tires" should read ---tire---.

Column 10, line 42 which reads: "tires" should read ---tire---.

Column 10, line 44 which reads: "tires" should read ---tire---.

Column 10, line 47 which reads: "of weight" should read ---by weight---.

Signed and Sealed this

Fourteenth Day of October 1980

[SEAL]

Attest:

SIDNEY A. DIAMOND

Attesting Officer

Commissioner of Patents and Trademarks